(12) United States Patent
Zhang et al.

(10) Patent No.: US 8,731,792 B2
(45) Date of Patent: May 20, 2014

(54) SYSTEM AND METHOD FOR ESTIMATING HYDRAULIC PRESSURE WITHIN AND CONTROLLING A DRY DUAL CLUTCH TRANSMISSION

(75) Inventors: Zhen J. Zhang, Canton, MI (US); David Juhassz, Sterling Heights, MI (US); John E. Marano, Milford, MI (US)

(73) Assignee: GM Global Technology Operations LLC

( * ) Notice: Subject to any disclaimer, the term of this patent is extended or adjusted under 35 U.S.C. 154(b) by 286 days.

(21) Appl. No.: 13/242,245

(22) Filed: Sep. 23, 2011

(65) Prior Publication Data

US 2013/0080009 A1   Mar. 28, 2013

(51) Int. Cl.
*G06F 17/00* (2006.01)
*G06F 7/00* (2006.01)
*G06F 19/00* (2011.01)

(52) U.S. Cl.
USPC .............................................. 701/63; 701/62

(58) Field of Classification Search
USPC ........... 701/63, 51, 62, 29.2, 29.7, 30.3, 30.5, 701/30.7, 30.9, 31.1, 31.3, 34.4; 192/3.51, 192/3.57; 137/551, 552.7, 557, 565.13
See application file for complete search history.

(56) References Cited

U.S. PATENT DOCUMENTS

| | | | | |
|---|---|---|---|---|
| 5,683,149 A * | 11/1997 | Aizawa et al. | .................. | 303/10 |
| 6,132,010 A * | 10/2000 | Holt et al. | ........................ | 303/11 |
| 6,223,113 B1* | 4/2001 | McCunn et al. | ................ | 701/62 |
| 6,591,177 B1* | 7/2003 | Loffler | ............................ | 701/63 |
| 6,619,762 B2* | 9/2003 | Nitta et al. | ............... | 303/122.12 |
| 6,647,326 B2* | 11/2003 | Nakamori et al. | .............. | 701/22 |
| 7,107,134 B1* | 9/2006 | Melby et al. | ................... | 701/51 |
| 7,192,372 B2* | 3/2007 | Sawada | .......................... | 474/28 |
| 7,444,964 B2* | 11/2008 | Kanada et al. | ............. | 123/90.15 |
| 2008/0277230 A1* | 11/2008 | Youtt | ............................. | 192/57 |
| 2010/0241322 A1* | 9/2010 | Miyanoo | ......................... | 701/54 |
| 2010/0243402 A1* | 9/2010 | Momal | ...................... | 192/85.63 |

* cited by examiner

*Primary Examiner* — Khoi Tran
*Assistant Examiner* — Nicholas Kiswanto

(57) ABSTRACT

A control system for a dry dual clutch transmission (DCT) includes first, second, and third modules. The first module detects whether a hydraulic pressure sensor of a hydraulic fluid delivery system in the dry DCT has failed. The second module estimates a pressure of hydraulic fluid within an accumulator of the hydraulic fluid delivery system based on one of (i) torque generated by and temperature of a hydraulic fluid pump and (ii) a drain down period of the accumulator and a period since the hydraulic fluid pump was on. The third module controls start/stop of the hydraulic fluid pump based on the estimated hydraulic fluid pressure when the hydraulic pressure sensor has failed.

20 Claims, 5 Drawing Sheets

SYSTEM AND METHOD FOR ESTIMATING HYDRAULIC PRESSURE WITHIN AND CONTROLLING A DRY DUAL CLUTCH TRANSMISSION

FIELD

The present disclosure relates to transmission control systems and more particularly to a system and method for estimating hydraulic pressure within and controlling a dry dual clutch transmission (DCT).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (NF) mixture within cylinders to drive pistons that rotatably turn a crankshaft and generate drive torque. The drive torque is transferred from the crankshaft to a driveline of a vehicle via a transmission. A dual clutch transmission (DCT) includes two clutches that each selectively engage gears to provide a plurality of gear ratios. For example, one DCT clutch may control odd number gears and another DCT clutch may control even number gears. The transmission may be coupled to the crankshaft via a fluid coupling such as a torque converter. The DCT, however, may also be directly coupled to the crankshaft (also known as a "dry DCT").

SUMMARY

A control system for a dry dual clutch transmission (DCT) includes first, second, and third modules. The first module detects whether a hydraulic pressure sensor of a hydraulic fluid delivery system in the dry DCT has failed. The second module estimates a pressure of hydraulic fluid within an accumulator of the hydraulic fluid delivery system based on one of (i) torque generated by and temperature of a hydraulic fluid pump and (ii) a drain down period of the accumulator and a period since the hydraulic fluid pump was on. The third module controls start/stop of the hydraulic fluid pump based on the estimated hydraulic fluid pressure when the hydraulic pressure sensor has failed.

A method for controlling a dry dual clutch transmission (DCT) includes detecting whether a hydraulic pressure sensor of a hydraulic fluid delivery system in the dry DCT has failed, estimating a pressure of hydraulic fluid within an accumulator of the hydraulic fluid delivery system based on one of (i) torque generated by and temperature of a hydraulic fluid pump and (ii) a drain down period of the accumulator and a period since the hydraulic fluid pump was on, and controlling start/stop of the hydraulic fluid pump based on the estimated hydraulic fluid pressure when the hydraulic pressure sensor has failed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
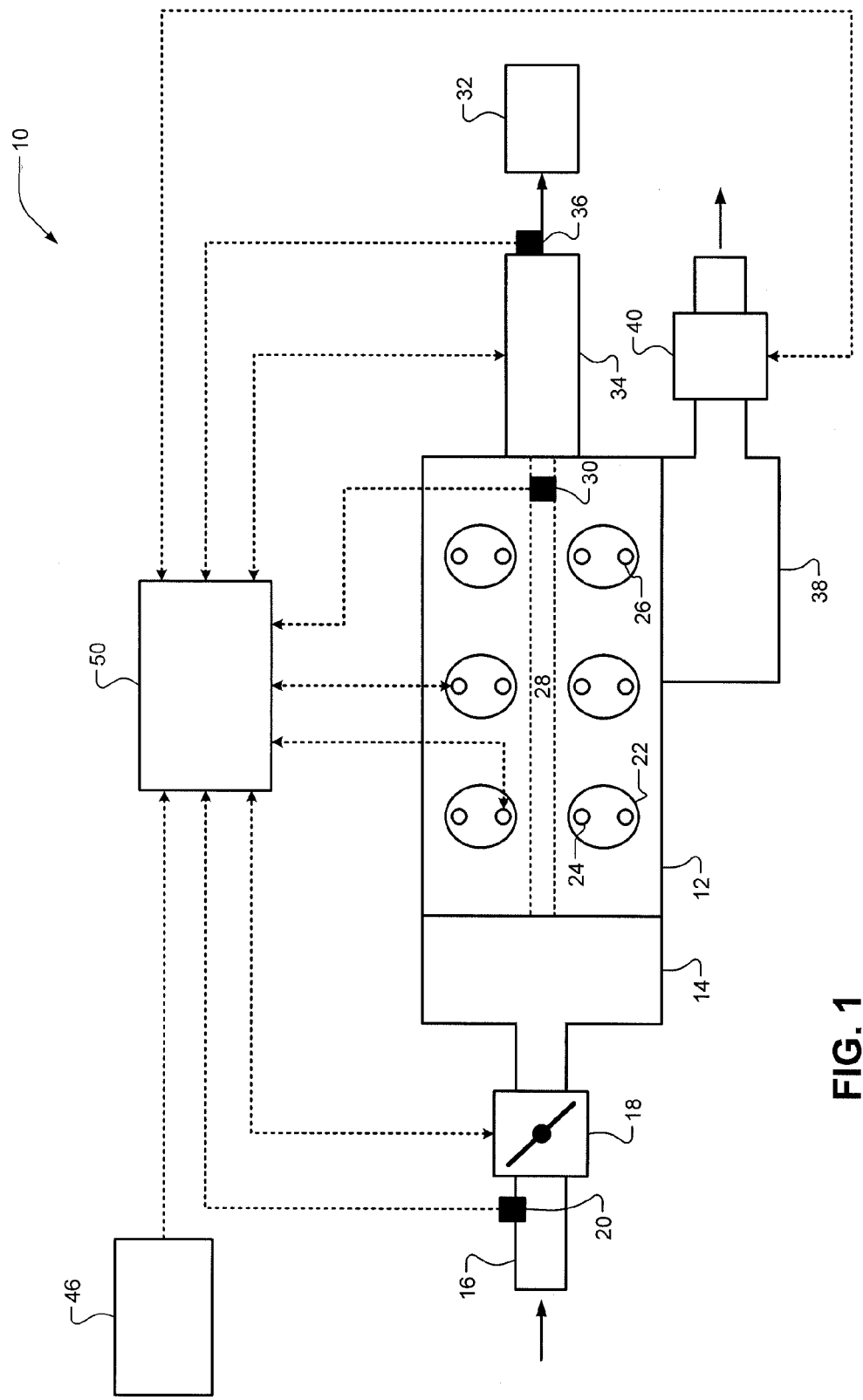
FIG. 1 is a functional block diagram of an example engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A dry dual clutch transmission (DCT) includes a hydraulic fluid delivery system that controls a flow of hydraulic fluid (e.g., oil) within the dry DCT. Specifically, the hydraulic fluid delivery system may supply pressurized hydraulic fluid to a clutch system and/or a gear system to engage a desired gear ratio. The hydraulic fluid delivery system may include a hydraulic fluid pump, an accumulator, and a hydraulic fluid pressure sensor. The hydraulic fluid pump may be powered by an electric motor and therefore may selectively pump hydraulic fluid from a hydraulic fluid reservoir into the accumulator. The accumulator stores the pressurized hydraulic fluid and supplies the pressurized hydraulic fluid to the clutch system and/or the gear system. The hydraulic fluid pressure sensor measures a pressure of hydraulic fluid within the accumulator.

A control system for the dry DCT selectively controls the hydraulic fluid pump to maintain a pressure within the accumulator (measured by the hydraulic fluid pressure sensor) within a predetermined pressure range. The control system, therefore, may turn the hydraulic fluid pump on/off when the measured hydraulic fluid pressure reaches minimum/maximum values of the predetermined pressure range. In other words, when the measured pressured decreases to a minimum pressure value, the control system may turn on the hydraulic fluid pump, and after the measured pressure increases to the maximum pressure value, the control system may turn off the hydraulic fluid pump. This on/off cycle of the hydraulic fluid pump may also be referred to as a charge/discharge cycle of the accumulator. The hydraulic fluid pressure sensor, however, may fail. Therefore, the hydraulic pressure within the accumulator may be unknown to the control system causing the control system to incorrectly control the hydraulic fluid delivery system thereby damaging the dry DCT and/or the engine.

Accordingly, a system and method are presented for hydraulic pressure estimation in the event of a failed hydraulic pressure sensor. The system and method presented may be implemented in any high pressure hydraulic systems having electric pumps (i.e., high pressure hydraulic pumps). For example, these systems may include, but are not limited to, anti-lock braking systems (ABS), high pressure diesel fuel systems, manually automated transmissions, and the like. Specifically described herein, the system and method may be implemented in a dry DCT thereby providing for improved control of the dry DCT.

The system and method may first detect whether a hydraulic fluid pressure sensor in the dry DCT has failed. When the hydraulic fluid pressure sensor has failed, the system and method may estimate the hydraulic fluid pressure within the accumulator of the dry DCT based on (i) torque generated by and temperature of a hydraulic fluid pump/electric motor of the dry DCT or (ii) a drain down period of the accumulator and a period since the hydraulic fluid pump was off. The system and method may then control start/stop of the hydraulic fluid pump/electric motor based on the estimated hydraulic fluid pressure.

Referring now to FIG. 1, an example engine system 10 includes an engine 12. The engine 12 may be a spark ignition (SI) engine, a diesel engine, a homogeneous charge compression ignition (HCCI) engine, or another suitable type of engine. The engine system 10 may also be a hybrid system and therefore may include additional components such as an electric motor and a battery system.

The engine 12 draws air into an intake manifold 14 through an induction system 16 that may be regulated by a throttle 18. For example, the throttle 18 may be electrically controlled via electronic throttle control (ETC). A mass air flow (MAF) sensor 20 measures MAF through the throttle 18. For example, the measured MAF may indicate a load on the engine 12. The air in the intake manifold 14 is distributed to a plurality of cylinders 22 and combined with fuel to create an air/fuel (A/F) mixture. While six cylinders are shown, the engine 12 may have other numbers of cylinders.

Fuel injectors 24 may inject the fuel to create the A/F mixture. For example, the fuel injectors 24 may inject the fuel into intake ports of the cylinders 22, respectively, or directly into the cylinders 22, respectively. The A/F mixture is compressed by pistons (not shown) within the cylinders 22. Depending on the type of engine 12, spark plugs 26 may ignite the compressed A/F mixture. Alternatively, the A/F mixture may be compressed until auto-ignition occurs. The combustion of the A/F mixture within the cylinders drives the pistons (not shown) which rotatably turn a crankshaft 28 and generate drive torque. An engine speed sensor 30 measures a rotational speed of the crankshaft 28 (e.g., in revolutions per minute, or RPM).

The drive torque at the crankshaft 28 is transferred to a driveline 32 of a vehicle via a dry dual clutch transmission (DCT) 34. The dry DCT 34 includes a plurality of gear ratios for translating the drive torque at the crankshaft 28 to a desired drive torque at the driveline 32. The dry DCT 34 may also include two clutches for shifting between the gear ratios. A transmission output shaft speed (TOSS) sensor 36 measures a rotational speed of an output shaft of the dry DCT 34. For example, the measured TOSS may indicate a speed of the vehicle.

Exhaust gas resulting from combustion is expelled from the cylinders 22 into an exhaust manifold 38. The exhaust gas in the exhaust manifold 38 may be treated by an exhaust treatment system 40 before being released into the atmosphere. For example, the exhaust treatment system 40 may include at least one of an oxidation catalyst (OC), nitrogen oxide (NOx) adsorbers/absorbers, a lean NOx trap, a selective catalytic reduction (SCR) system, a particulate matter (PM) filter, and a three-way catalytic converter.

A control module 50 controls operation of the engine system 10. The control module 50 may receive signals from the throttle 18, the MAF sensor 20, the fuel injectors 24, the spark plugs 26, the engine speed sensor 30, the dry DCT 34, the TOSS sensor 38, and/or the exhaust treatment system 40. The control module 50 may control the throttle 18, the fuel injectors 24, the spark plugs 26, the dry DCT 34, and/or the exhaust treatment system 40. The control module 50 may also implement the system or method of the present disclosure.

Figure 2:
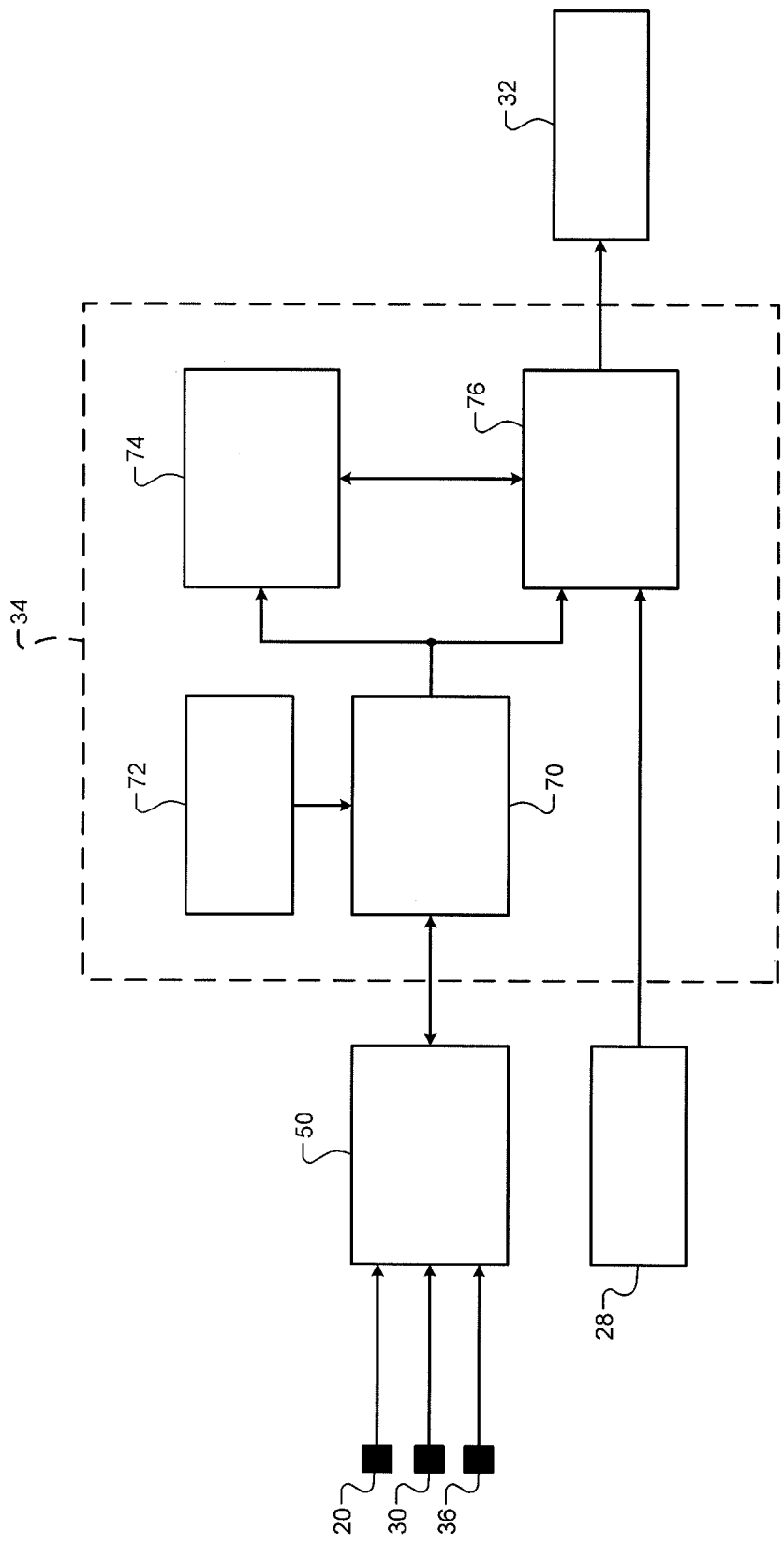
FIG. 2 is a functional block diagram of an example dry dual clutch transmission (DCT) according to one implementation of the present disclosure.

Referring now to FIG. 2, an example of the dry DCT 34 is shown. The dry DCT 34 translates input torque (via the crankshaft 28) to output torque (at the driveline 32). The dry DCT 34 may include a hydraulic fluid delivery system 70, a hydraulic fluid reservoir 72, a clutch system 74, and a gear system 76.

The dry DCT 34 transfers drive torque from the crankshaft 28 to the driveline 32 of the vehicle via the gear system 76. Specifically, a gear ratio of the gear system 76 (selected via clutch system 74) translates the drive torque at the crankshaft 28 to a desired drive torque at the driveline 32. The control module 50 may control the dry DCT 34 based on various operating parameters. For example, the control module 50 may control the dry DCT 34 based on signals from the MAF sensor 20, the engine speed sensor 30, and the TOSS sensor 36 indicating engine load (i.e., driver input), engine speed, and vehicle speed, respectively. The hydraulic fluid delivery system 70 may supply the clutch system 74 and the gear system 76 with pressurized hydraulic fluid (e.g., oil) from the hydraulic fluid reservoir 72. Specifically, the control module 50 may control the hydraulic fluid delivery system 70 to hydraulically actuate specific clutches and gears of the clutch system 74 and the gear system 76, respectively.

Figure 3A:
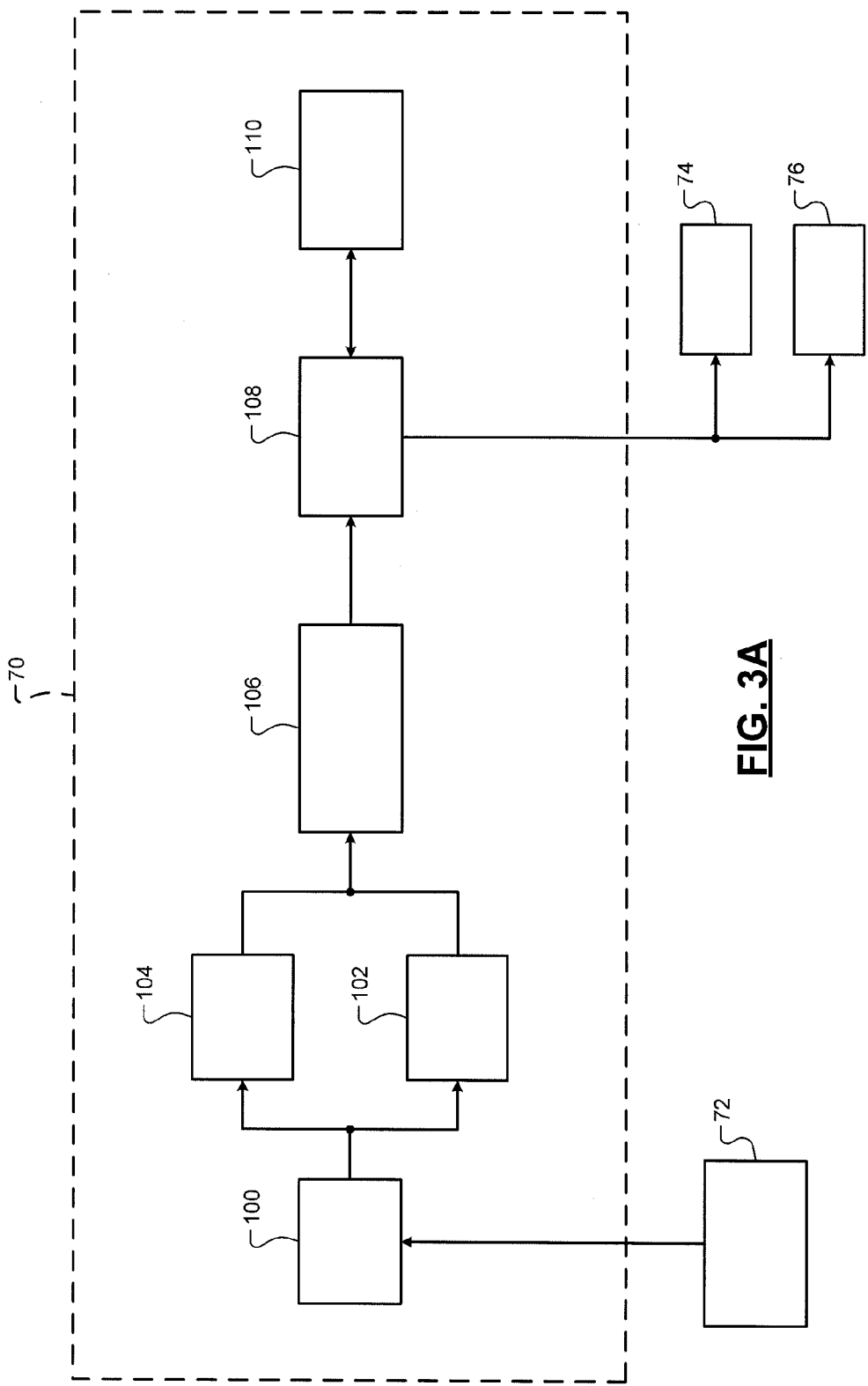
FIG. 3A is a functional block diagram of an example hydraulic fluid delivery system for a dry DCT according to one implementation of the present disclosure.

Referring now to FIG. 3A, an example of the hydraulic fluid delivery system 70 is shown. The hydraulic fluid delivery system 70 selectively supplies hydraulic fluid to (i) an accumulator 108 and/or (ii) the clutch system 74 and the gear system 76. The hydraulic fluid delivery system 70 may include an hydraulic fluid pump 100 powered by an electric motor (hereinafter referred to as "electric pump 100"), a pressure side filter module 102, a filter bypass module 104, an accumulator pressure retention module 106, the accumulator 108, and a hydraulic pressure sensor 110.

The electric pump 100 selectively pumps hydraulic fluid (e.g., oil) from the hydraulic fluid reservoir 72 to (i) the accumulator 108 and/or (ii) the clutch system 74 and the gear system 76. The electric pump 100 may be controlled by the control module 50. For example, the electric pump 100 may include a motor that generates torque to drive a centrifugal pump that pumps the hydraulic fluid from the hydraulic fluid reservoir 72. The pressure side filter module 102 limits a change in hydraulic fluid pressure (i.e., prevents severe pressure changes). The filter bypass module 104, however, bypasses the pressure side filter module 102 when hydraulic fluid pressure exceeds a pressure threshold. For example, the filter bypass module 104 may include a ball valve.

The accumulator pressure retention module 106 prevents pressure leakage from the accumulator side of the hydraulic fluid delivery system 72 back towards the electric pump 100. In other words, the accumulator pressure retention module 106 selectively allows the accumulator 108 to fill with hydraulic fluid. In some implementations, the hydraulic fluid delivery system 72 may also include an accumulator bypass valve (not shown) and/or an accumulator bypass ball for additional control of filling/draining the accumulator 108. In addition, in some implementations, the hydraulic fluid delivery system 72 may also include a line blow-off valve located (i) between the electric pump 100 and the pressure side filter module 102/filter bypass module 104 or (ii) between the accumulator 108 and the clutch system 74/gear system 76.

The accumulator 108 stores pressurized hydraulic fluid and supplies pressurized hydraulic fluid to the clutch system 74 and the gear system 76. For example, the accumulator 108 may be a nitrogen-charged accumulator. The accumulator 108, however, may store hydraulic fluid within a predetermined pressure range. For example only, the predetermined pressure range may be from approximately 41-42 Bar to approximately 62-62.5 Bar (or ~600-900 pounds per square inch, or psi). The predetermined pressure range, however, may vary based on other factors such as designs of the accumulator 108 and/or other components of the dry DCT 34 (e.g., the clutch system 74 and the gear system 76). The hydraulic pressure sensor 110 measures a pressure of hydraulic fluid within the accumulator 108.

Figure 3B:
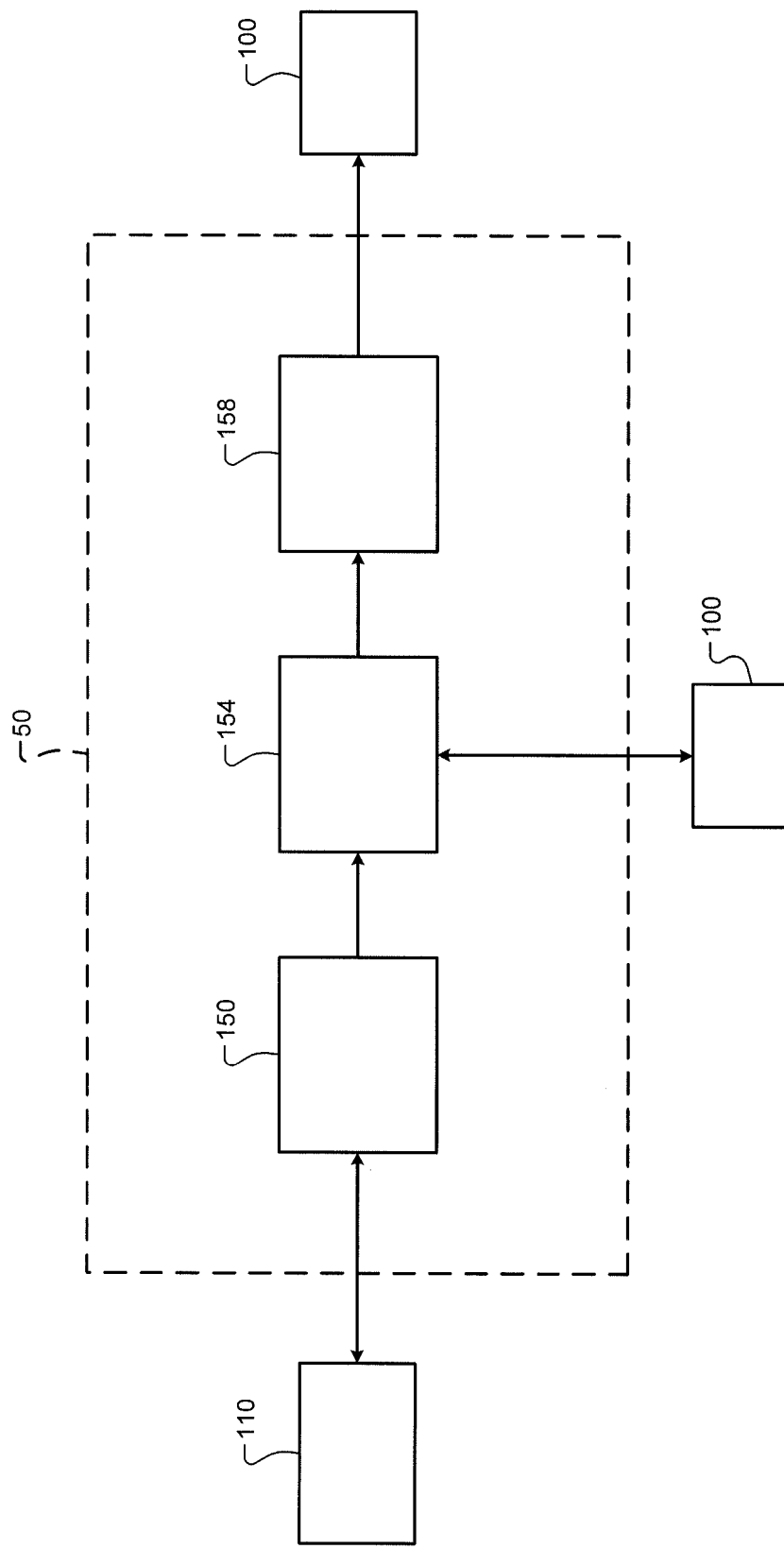
FIG. 3B is a functional block diagram of an example control module according to one implementation of the present disclosure.

Referring now to FIG. 3B, an example of the control module 50 is shown. The control module 50 communicates with the hydraulic pressure sensor 110 of the hydraulic fluid delivery system 70 within the dry DCT 34. The control module 50 also controls the electric pump 100 within the hydraulic fluid delivery system 70 within the dry DCT 34. The control module 50 may include a failure detection module 150, a pressure estimation module 154, and a pump control module 158.

The failure detection module 150 communicates with the hydraulic pressure sensor 110 to determine whether the hydraulic pressure sensor 110 has failed. For example, the failure detection module 150 may determine that the hydraulic pressure sensor 110 has failed when measurements from the hydraulic pressure sensor 110 are outside of predetermined thresholds (i.e., a predetermined operating range). However, the failure detection module 150 may determine that the hydraulic pressure sensor 110 has failed according to other suitable methods. The failure detection module 150 may also generate a signal to notify the pressure estimation module 154 that the hydraulic pressure sensor 110 has failed.

The pressure estimation module 154 may estimate hydraulic fluid pressure within the accumulator 108 when the hydraulic pressure sensor 110 has failed. The pressure estimation module 154 may estimate the hydraulic fluid pressure based on (i) torque generated by and temperature of a motor of the electric pump 100 or (ii) a period for the accumulator 108 to drain down and a period since the electric pump 100 was on. Specifically, the pressure estimation module 154 may estimate the hydraulic fluid pressure within the accumulator 108 when the electric pump 100 is on based on (i) the torque generated by the motor of the electric pump 100 and (ii) the temperature of the electric pump 100. For example only, the torque and the temperature of the motor of the electric pump 100 may be measured using sensors. Additionally, for example, the pressure estimation module 154 may estimate the hydraulic fluid pressure within the accumulator 108 when the electric pump 100 is on using a look-up table relating motor torque and temperature to hydraulic fluid pressure.

Alternatively, the pressure estimation module 154 may estimate the hydraulic fluid pressure within the accumulator 108 when the electric pump 100 is off based on (i) the drain down period of the accumulator 108 and (ii) a period since the electric pump was on (i.e., an off period). For example, the pressure estimation module 154 may estimate the hydraulic fluid pressure within the accumulator 108 when the electric pump 100 is off using a look-up table relating the accumulator drain down period and the electric pump off period to hydraulic fluid pressure.

The pump control module 158 receives the estimated hydraulic pressure from the pressure estimation module 154. The pump control module 158 may control start/stop of the electric pump 100 based on the estimated hydraulic pressure and first and second pressure thresholds, the second pressure threshold being greater than the first pressure threshold. However, when the hydraulic fluid pressure sensor 110 has failed and a shift operation of the dry DCT 34 occurs, the pump control module 158 may start the electric pump 100 (regardless of the estimated hydraulic fluid pressure) for safety reasons.

Otherwise, the pump control module 158 may start the electric pump 100 to fill the accumulator 108 when the estimated hydraulic pressure is less than or equal to the first pressure threshold. For example only, the first pressure threshold may be approximately 42 Bar. The pump control module 158 may stop the electric pump 100 to drain the accumulator 108 when the estimated hydraulic pressure is greater than or equal to the second pressure threshold. For example only, the second pressure threshold may be approximately 62 Bar.

Figure 4:
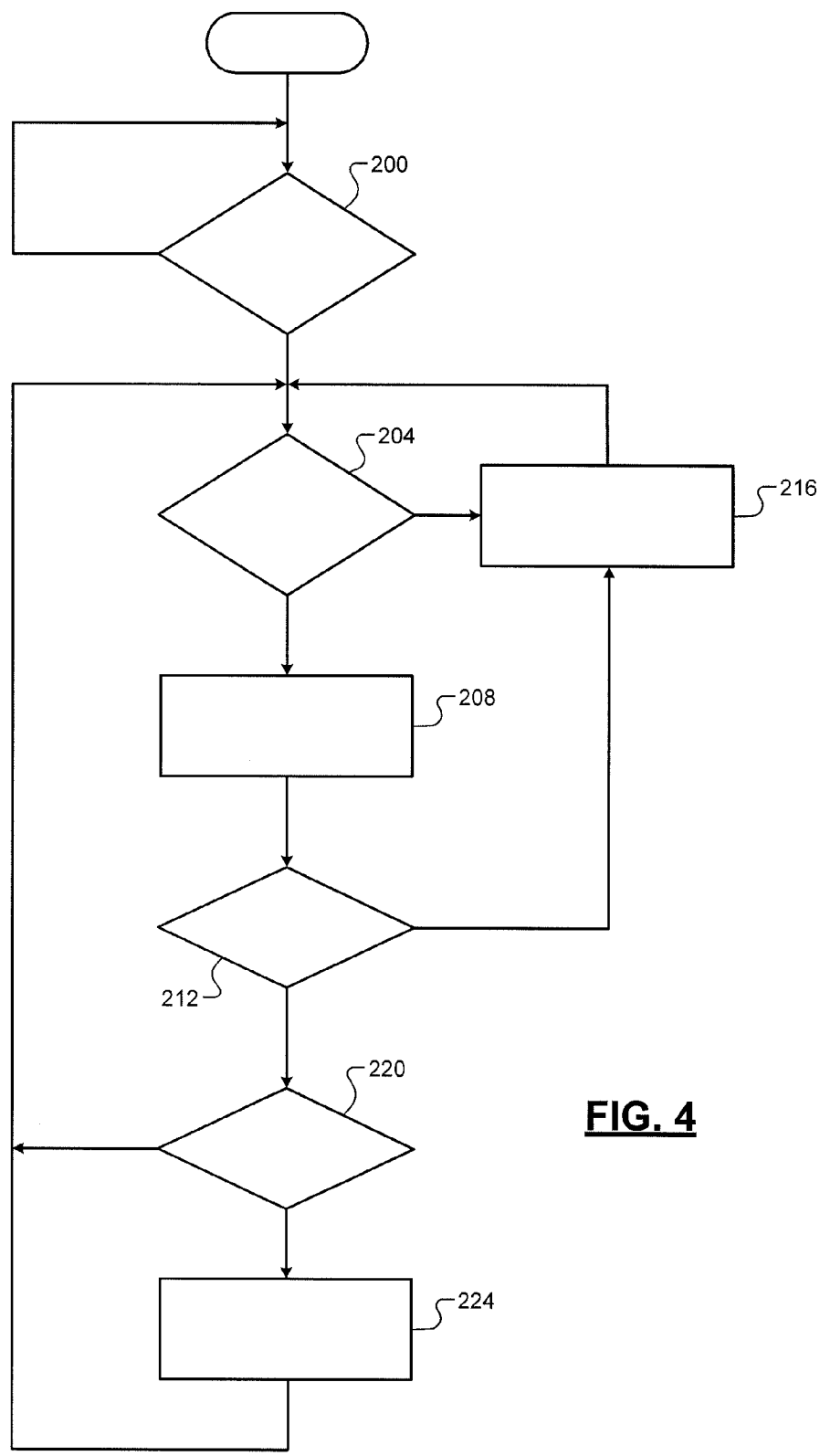
FIG. 4 is a flow diagram illustrating an example method for estimating pressure within and controlling a dry DCT according to one implementation of the present disclosure.

Referring now to FIG. 4, an example method for estimating pressure within and controlling a DCT begins at 200. At 200, the control module 50 may determine whether the hydraulic pressure sensor 110 has failed. If true, control may proceed to 204. If false, control may end. Rather, control may continue start/stop operation of the electric pump 100 based on measurements from the properly functioning hydraulic pressure sensor 110. At 204, the control module 50 may determine whether a shift operation of the dry DCT is occurring. If true, control may proceed to 216. If false, control may proceed to 208.

At 208, the control module 50 may estimate the hydraulic pressure within the accumulator 108. For example, the control module 50 may estimated the hydraulic pressure within the accumulator 108 based on (i) torque generated by and temperature of a motor of the electric pump 100 or (ii) a period for the accumulator 108 to drain down and a period since the electric pump 100 was on. At 212, the control module 50 may determine whether the estimated hydraulic pressure ($P_{EST}$) is less than or equal to the first pressure threshold ($P_{TH1}$). If true, control may proceed to 216. If false, control may proceed to 224.

At 216, the control module 50 may start the electric pump 100 to fill the accumulator 108. Control may then return to 204. At 220, the control module 50 may determine whether the estimated hydraulic pressure is greater than or equal to the second pressure threshold ($P_{TH2}$). If true, control may proceed to 224. If false, control may return to 204. At 224, the control module 50 may stop the electric pump 100 to allow the accumulator 108 to drain down before restarting the electric pump 100 for another fill cycle. Control may then return to 204.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a dry dual clutch transmission (DCT), the control system comprising:
   a first module that detects whether a hydraulic pressure sensor of a hydraulic fluid delivery system in the dry DCT has failed;
   a second module that estimates a pressure of hydraulic fluid within an accumulator of the hydraulic fluid delivery system based on one of (i) torque generated by and temperature of a hydraulic fluid pump and (ii) a drain down period of the accumulator and a period since the hydraulic fluid pump was on; and
   a third module that controls start/stop of the hydraulic fluid pump based on the estimated hydraulic fluid pressure when the hydraulic pressure sensor has failed.

2. The control system of claim 1, wherein the third module starts the hydraulic fluid pump when a shift of the dry DCT occurs.

3. The control system of claim 1, wherein the third module starts the hydraulic fluid pump when the estimated hydraulic fluid pressure is less than or equal to a first pressure threshold.

4. The control system of claim 3, wherein the first pressure threshold is approximately 42 Bar.

5. The control system of claim 3, wherein the third module stops the hydraulic fluid pump when the estimated hydraulic fluid pressure is greater than or equal to a second pressure threshold, wherein the second pressure threshold is greater than the first pressure threshold.

6. The control system of claim 5, wherein the second pressure threshold is approximately 62 Bar.

7. The control system of claim 1, wherein the second module estimates the hydraulic pressure within the accumulator when the hydraulic fluid pump is on based on (i) the torque generated by the hydraulic fluid pump and (ii) the temperature of the hydraulic fluid pump.

8. The control system of claim 7, wherein the second module estimates the hydraulic fluid pressure within the accumulator when the hydraulic fluid pump is on using a look-up table relating torque and temperature to hydraulic fluid pressure.

9. The control system of claim 1, wherein the second module estimates the hydraulic pressure within the accumulator when the hydraulic fluid pump is off based on (i) the drain down period of the accumulator and (ii) a period since the hydraulic fluid pump was on.

10. The control system of claim 9, wherein the second module estimates the hydraulic fluid pressure within the accumulator when the hydraulic fluid pump is off using a look-up table relating the drain down period of the accumulator and the off period of the hydraulic fluid pump to hydraulic fluid pressure.

11. A method for controlling a dry dual clutch transmission (DCT), the method comprising:
    detecting whether a hydraulic pressure sensor of a hydraulic fluid delivery system in the dry DCT has failed;
    estimating a pressure of hydraulic fluid within an accumulator of the hydraulic fluid delivery system based on one of (i) torque generated by and temperature of a hydraulic fluid pump and (ii) a drain down period of the accumulator and a period since the hydraulic fluid pump was on; and
    controlling start/stop of the hydraulic fluid pump based on the estimated hydraulic fluid pressure when the hydraulic pressure sensor has failed.

12. The method of claim 11, further comprising starting the hydraulic fluid pump when a shift of the dry DCT occurs.

13. The method of claim 11, further comprising starting the hydraulic fluid pump when the estimated hydraulic fluid pressure is less than or equal to a first pressure threshold.

14. The method of claim 13, wherein the first pressure threshold is approximately 42 Bar.

15. The method of claim 13, further comprising stopping the hydraulic fluid pump when the estimated hydraulic fluid pressure is greater than or equal to a second pressure threshold, wherein the second pressure threshold is greater than the first pressure threshold.

16. The method of claim 15, wherein the second pressure threshold is approximately 62 Bar.

17. The method of claim 11, further comprising estimating the hydraulic pressure within the accumulator when the hydraulic fluid pump is on based on (i) the torque generated by the hydraulic fluid pump and (ii) the temperature of the hydraulic fluid pump.

18. The method of claim 17, further comprising estimating the hydraulic fluid pressure within the accumulator when the hydraulic fluid pump is on using a look-up table relating torque and temperature to hydraulic fluid pressure.

19. The method of claim 11, further comprising estimating the hydraulic pressure within the accumulator when the hydraulic fluid pump is off based on (i) the drain down period of the accumulator and (ii) a period since the hydraulic fluid pump was on.

20. The method of claim 19, further comprising estimating the hydraulic fluid pressure within the accumulator when the hydraulic fluid pump is off using a look-up table relating the drain down period of the accumulator and the off period of the hydraulic fluid pump to hydraulic fluid pressure.

* * * * *